United States Patent Office 3,434,281
Patented Mar. 25, 1969

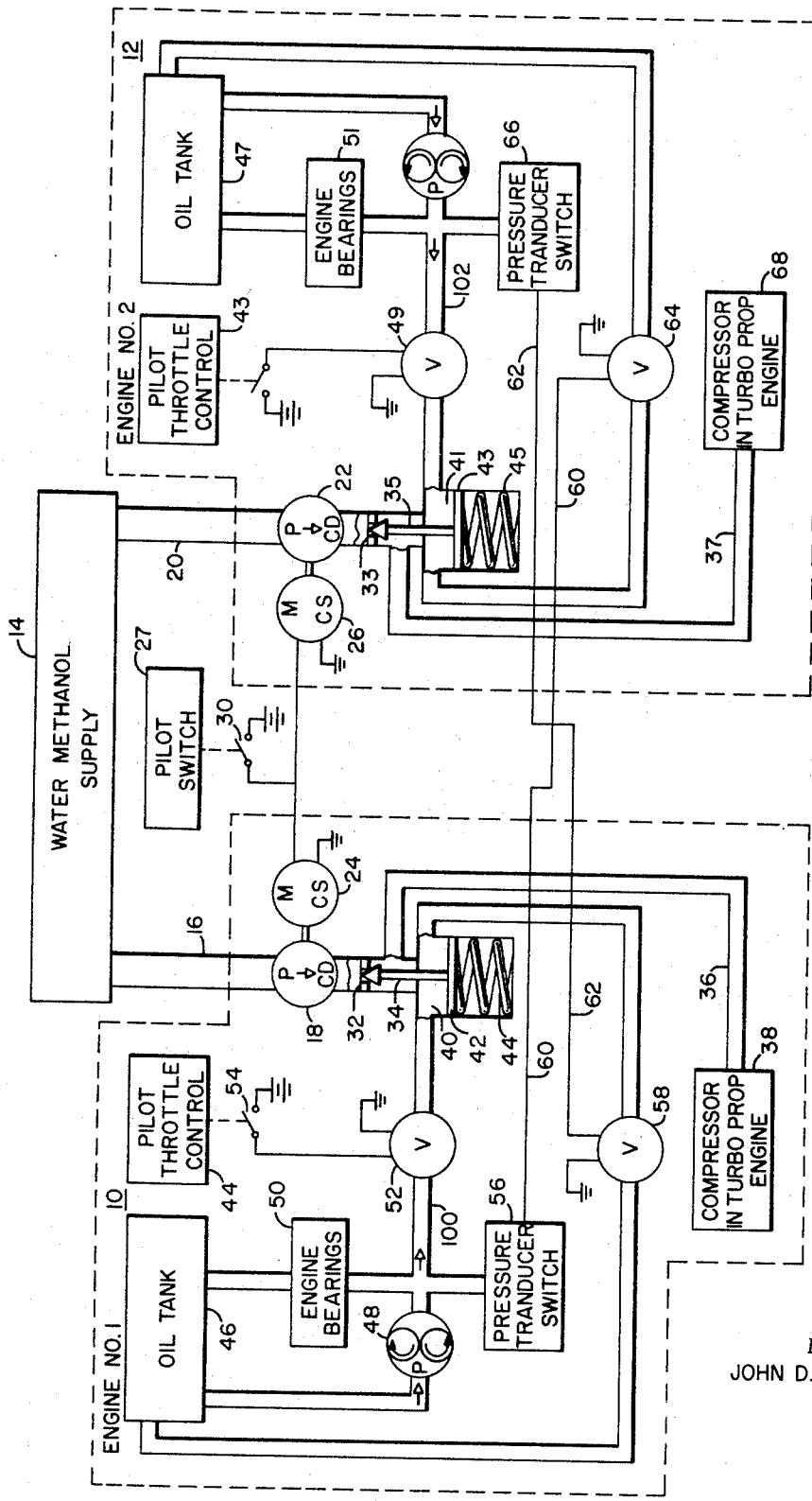

3,434,281
STANDBY AUTOMATIC WATER-METHANOL
SYSTEM FOR MULTIENGINE AIRCRAFT
John D. Donaldson, San Diego, Calif., assignor to General
Dynamics Corporation, San Diego, Calif., a corporation of Delaware
Filed June 5, 1967, Ser. No. 643,546
Int. Cl. F02c 7/02; F02k 11/00
U.S. Cl. 60—39.15                    5 Claims

ABSTRACT OF THE DISCLOSURE

This system operates to provide water-methanol to one engine of a multiengine aircraft when another engine fails or substantially fails during operation, such as during take-off, to increase the power of the engine and compensate for the loss in thrust caused by the engine failure.

*Background of the invention*

It is well known that a mixture of water-methanol when injected into the compressor of a turboprop engine will increase the engine's power. These increased power ratings, known as "wet power ratings," are used to increase the power of the turboprop engines to lift heavy loads. However, since the water-methanol mixture is very expensive, it is of advantage to not have to use the mixture in normal flight or during normal take-off of the aircraft.

In two engine turboprop aircraft, the power provided by a single engine is often insufficient to adequately lift the aircraft during take-off should one of the engines fail. Systems have been provided to supply water-methanol to the engines during take-off and flight to provide wet power ratings to lift heavy loads. However should a greater amount of water-methanol be injected into the engine because of engine failure, then the good engine fails because of too great a quantity of water-methanol being injected into the compressor of the turboprop engine. Therefore it is advantageous to have a standby water-methanol system that injects water-methanol into a good engine upon the failure of another engine in a multiengine aircraft, and that does not require water-methanol to be injected into all engines at all times.

*Summary of the invention*

The standby automatic water-methanol system of this invention has a water-methanol supply for use in all the engines. Appropriate conduits having valve means carry the water-methanol supply to the compressors in each of the turboprop engines. A pressure transducer switch that is responsive to the oil pressure in each engine provides a control for operating a valve in the water-methanol supply system of the other engines. Thus upon failure of one engine, the pressure transducer switch senses the drop in oil pressure in the failed engine and operates the valve in the water-methanol conduits to supply water-methanol mixture to the other engine or engines. This increases the power of the other engines sufficiently to allow the aircraft to continue flight or take off and pass out of the danger zone.

The pressure transducer device is responsive to the oil pressure in the oil system. This pressurized oil is created by a positive displacement pump that provides an output pressure that is substantially proportional to the engine revolutions. Accordingly any drop in the r.p.m. of an engine will cause a proportional drop in oil pressure that inturn operates the transducer. Other control means prevent initiating the water-methanol standby system until the engines are throttled to a given r.p.m. Therefore it is possible to provide an automatic, instantaneously operating system that will increase the power of a good engine upon the failure of another engine even before the pilot is able to sense the failure of the engine. This is particularly important in the critical period of time during take-off of an aircraft.

It is therefore an object of this invention to provide a new and improved water-methanol system for increasing the power of a good engine upon failure of another engine in a multiengine aircraft.

Other objects and advantages of this invention will become more apparent upon reading the following detailed specification having a drawing in which like reference numerals designate like parts throughout and in which:

The drawing illustrates in schematic form the water-methanol supply system with control valves for a two engine turboprop aircraft. The aircraft is provided with a water-methanol supply 14. The appropriate mixture of water-methanol to provide increased wet power rating is well known. It usually involves, for example, a percentage of 39 percent water and 61 percent methanol. The water-methanol mixture is supplied to each engine through conduits 16 and 20 that are normally closed by valves 32 and 33 during non-operation of the system. Pumps 18 and 22, that are normally centrifugal circulating pumps, are driven by motors 24 and 26 to continuously pump water-methanol in lines 16 and 20. The pumps 24 and 26 are energized by the pilot at take-off by closing the pilot switch 30 in the line that supplies power to the respective motors 24 and 26. The centrifugal pumps 18 and 22 merely turn during the time that the valves 32 and 33 are closed. Upon the opening of valves 32 and 33, by moving pistons 42 and 43 downwardly against springs 44 or 45, then water-methanol is supplied to the respective compressors 38 or 68 in one or the other of the turboprop engines 10 and 12.

The operation of valves 42 and 43 are controlled as follows.

Each engine is provided with an oil supply 46 or 47 that can represent the oil reservoir of the engine. Constant displacement type pumps 19 and 48 provide oil under pressure to the engine bearings 50, which oil then returns to the reservoirs or sumps 46 and 47. The oil under pressure provided by pumps 19 and 48 also supply oil under pressure through lines 100 and 102 and through normally opened valves 49 and 52 and through normally opened valves 58 and 64 to the sumps 46 and 47. Each of the apparatus for each of the engines 10 and 12 operate identically. Accordingly, the description of operation will be directed to only one of the engines.

Normally the oil pressure in line 100 does not have sufficient force to force the piston 42 against the resistance of spring 44 in cavity 40. Thus the oil merely circulates through line 100 and valve 32 and 34 remains closed. Upon failure of engine No. 1, the r.p.m. of the driven gear pump 48 decreases with the decrease in r.p.m. of the engine No. 1. This results in a drop in oil pressure in line 100 and on the pressure transducer 56. The pressure transducer 56 senses this drop in oil pressure in engine No. 1 and provides an output current for closing the solenoid control valve 64 in engine No. 2. The closing of valve 64 blocks the passage of oil in line 102 and causes an increase in the oil pressure in cavity 41 that forces piston 43 down against spring 45. Plunger 35 is pulled downwardly opening valve 33 and allowing water-methanol to be supplied by pump 22 through conduit 20 and 37 to the compressor in the turboprop engine No. 2. This provides wet power to engine No. 2 that compensates in increased thrust for the failure of engine No. 1. The system operates in reverse where engine No. 2 fails and engine No. 1 receives injected water-methanol.

A pilot throttle control 44 operates a switch 54 to open valve 52 when the pilot throttle is moved to a position that will provide a given engine r.p.m. Usually valve 52 is opened only when the pilot throttle has passed the 14,700 r.p.m. position for a given engine that requires 15,000 r.p.m. at take-up.

In operation, prior to take-off the pilot selects the mode of operation of the water-methanol system. This is accomplished by the pilot operating pilot switch 27 and 30 that energizes the motors 24 and 26 for operating pumps 18 and 22. The engines are accelerated at take-off and when the pilot throttle controls 44 and 45 are set above 14,800 r.p.m. then switches 54 and 55 are closed opening valves 49 and 52 allowing pressurized oil to flow in lines 100 and 102 through valves 58 and 64 to tanks 46 and 47. Valves 32 and 33 remain closed during this operation. Should either engine 10 or 12 fail, then the r.p.m. of the engine that drives either pump 19 or pump 48 decreases causing a drop in oil pressure in either line 100 or 102 that is detected by the pressure transducers 56 and 66. This causes either solenoid valve 58 or solenoid valve 64 to close in response to an electrical signal through lines 60 and 62 and thereby increase the oil pressure in lines 100 or 102 of the engines. Either piston valves 42 or 43 opens valves 32 or 33 allowing water-methanol to be supplied through line 36 or line 37 to the compressors 38 or 68 of the operating turboprop engine.

Thus should any of the engines fail during take-off, this failure will be immediately detected by the drop in oil pressure that will in turn cause water-methanol to be injected into the operating engine. In using this system, it has been found that single engine wet power take-off climb limitations can be achieved with only a small degradation of take-off distance performance over using two engine dry power.

Other objects and advantages of this invention will become more apparent to those having skill in the art, and applicant only desires to be limited to the claims.

Having disclosed my invention, I now claim:

1. A standby automatic water-methanol system for multiengine aircraft comprising.
   an aircraft having at least two engines,
   a supply of water-methanol on said aircraft,
   conduit means for carrying portions of said water-methanol to each of said engines,
   normally closed first valve means for each of said engines and in said conduit means for controlling the flow of said water-methanol therethrough, and
   control means connected to said first valve means in each of said engines and responsive to the operation of said engines for automatically opening said first valve means in other of said engines when one of said engines substantially fails.

2. A standby automatic water-methanol system for multiengine aircraft as claimed in claim 1 in which,
   each of said engines having an individual pressurized oil supply system,
   pump means driven by each engine for pressurizing the oil in said systems,
   pressure transducer means for each of said engines for detecting a drop in oil pressure in each of said systems and providing an output signal, and
   said control means being responsive to said output signal from said pressure transducer means for opening said first valve means in said other of said engines when said pressure transducer means detects a drop in oil pressure in said one of said engines.

3. A standby automatic water-methanol system for multiengine aircraft as claimed in claim 2 including,
   throttle control means having several positions for controlling the revolutions per minute of said engines, and
   second valve control means in each of said oil supply systems being responsive to said throttle control means for opening said oil supply systems when said engine revolutions per minute are set by said throttle control means above a given number.

4. A standby automatic water-methanol system for multiengine aircraft as claimed in claim 3 in which,
   said engines being turboprop engines, and
   said water-methanol being supplied to the compressor in said turboprop engines.

5. A standby automatic water-methanol system for multiengine aircraft as claimed in claim 2 in which,
   said oil pressure systems having an oil sump for each engine,
   said pump means forcing oil from said sumps through a plurality of channels to return to said sumps,
   a spring biased piston in one of said channels for each of said engines being connected to said first valve means to close said first valve means when said oil pressure systems have given pressures, and
   said second valve means being positioned in said oil lines and responsive to said pressure transducer means in the oil pressure systems of said other engines for actuating a valve in said one of said channels closing said channel in response to a drop in oil pressure in said one of said engines, thereby increasing the oil pressure in said one of said channels forcing said spring biased piston against said spring and opening said first valve means.

References Cited

UNITED STATES PATENTS

| | | | |
|---|---|---|---|
| 2,336,232 | 12/1943 | Doran | 60—39.15 |
| 2,919,548 | 1/1960 | Herbstritt | 60—39.26 |
| 3,021,673 | 2/1962 | Mock | 60—39.55 XR |

FOREIGN PATENTS 617,729 2/1949 Great Britain.

MARTIN P. SCHWADRON, *Primary Examiner.*

ROBERT R. BUNEVICH, *Assistant Examiner.*

U.S. Cl. X.R.

60—39.09, 39.53, 97, 102, 224